(12) United States Patent
Bruls et al.

(10) Patent No.: US 11,734,875 B2
(45) Date of Patent: Aug. 22, 2023

(54) IMAGE REPRESENTATION OF A SCENE

(71) Applicant: KONINKLIJKE PHILIPS N.V., Eindhoven (NL)

(72) Inventors: Fons Bruls, Eindhoven (NL); Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 186 days.

(21) Appl. No.: 17/425,966

(22) PCT Filed: Jan. 19, 2020

(86) PCT No.: PCT/EP2020/051205
§ 371 (c)(1),
(2) Date: Jul. 27, 2021

(87) PCT Pub. No.: WO2020/156844
PCT Pub. Date: Aug. 6, 2020

(65) Prior Publication Data
US 2022/0114782 A1 Apr. 14, 2022

(30) Foreign Application Priority Data

Jan. 30, 2019 (EP) .................................... 19154468

(51) Int. Cl.
*G06T 15/20* (2011.01)
*G06T 7/70* (2017.01)

(52) U.S. Cl.
CPC .............. *G06T 15/20* (2013.01); *G06T 7/70* (2017.01)

(58) Field of Classification Search
None
See application file for complete search history.

(56) References Cited

U.S. PATENT DOCUMENTS

| 2017/0003764 A1 | 1/2017 | Li |
| 2017/0037468 A1 | 2/2017 | Van Der Zaag et al. |
| 2018/0316908 A1* | 11/2018 | Chernobieff ......... H04N 13/275 |

FOREIGN PATENT DOCUMENTS

| WO | 2015155106 A | 10/2015 |
| WO | 2015155406 A1 | 10/2015 |
| WO | 2018035347 A1 | 2/2018 |

OTHER PUBLICATIONS

"Rendering Omni-directional Stereo Content", Google Inc, downloaded Jul. 26, 2021.

(Continued)

*Primary Examiner* — Frank S Chen

(57) ABSTRACT

An apparatus comprises a receiver (301) for receiving an image representation of a scene. A determiner (305) determines viewer poses for a viewer with respect to a viewer coordinate system. An aligner (307) aligns a scene coordinate system with the viewer coordinate system by aligning a scene reference position with a viewer reference position in the viewer coordinate system. A renderer (303) renders view images for different viewer poses in response to the image representation and the alignment of the scene coordinate system with the viewer coordinate system. An offset processor (309) determines the viewer reference position in response to an alignment viewer pose where the viewer reference position is dependent on an orientation of the alignment viewer pose and has an offset with respect to a viewer eye position for the alignment viewer pose. The offset includes an offset component in a direction opposite to a view direction of the viewer eye position.

21 Claims, 15 Drawing Sheets

(56) References Cited

OTHER PUBLICATIONS

"Distance_from_a_point_to_a_line" https://en.wikipedia.org/wiki/ downloaded Jul. 26, 2021.
"FDIS 23090-2 Omnidirectional Media Format" Choi et al Oct. 2017.
"Unstructured Lumigraph Rendering", Chris Buehler etal, http://cs.harvard.edu/~sjg/papers/ulr.pdf Proceedings of the 28th Annual Conf. on Computer Graphics 2001.
International Search Report and Written Opinion From PCT/EP2020/051205 dated Aug. 6, 2020.

* cited by examiner

101

IMAGE REPRESENTATION OF A SCENE

CROSS-REFERENCE TO PRIOR APPLICATIONS

This application is the U.S. National Phase application under 35 U.S.C. § 371 of International Application No. PCT/EP2020/051205, filed on Jan. 19, 2020, which claims the benefit of EP Patent Application No. EP 19154468.3, filed on Jan. 30, 2019. These applications are hereby incorporated by reference herein.

FIELD OF THE INVENTION

The invention relates to image representation of a scene and in particular, but not exclusively, to generation of an image representation and rendering of images from this image representation as part of a virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It is often desirable for a virtual reality experience to be provided based on real world capture. However, in many cases such an approach is restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

In many e.g. virtual reality applications a scene may be represented by an image representation, such as e.g. by one or more images representing specific view poses for the scene. In some cases, such images may provide a wide-angle view of the scene and may cover e.g. a full 360° view or cover a full view sphere.

In many applications, and specifically for virtual reality applications, an image data stream is generated from data representing the scene such that the image data stream reflects the user's (virtual) position in the scene. Such an image data stream is typically generated dynamically and in real time such that it reflects the user's movement within the virtual scene. The image data stream may be provided to a renderer which renders images to the user from the image data of the image data stream. In many applications, the provision of the image data stream to the renderer is via a bandwidth limited communication link. For example, the image data stream may be generated by a remote server and transmitted to the rendering device e.g. over a communication network. However, for most such applications it is important to maintain a reasonable data rate to allow efficient communication.

It has been proposed to provide a virtual reality experience based on 360° video streaming where a full 360° view of a scene is provided by a server for a given viewer position thereby allowing the client to generate views for different directions. Specifically, one of the promising applications of virtual reality (VR) is omnidirectional video (e.g. VR360 or VR180). The approach tends to result in a high data rate and therefore the number of view points for which a full 360° view sphere is provided is typically limited to a low number.

As a specific example, virtual reality glasses have entered the market. These glasses allow viewers to experience captured 360 degree (panoramic) video. These 360 degree videos are often pre-captured using camera rigs where individual images are stitched together into a single spherical mapping. In some such embodiments, images representing a full spherical view from a given viewpoint may be generated and transmitted to a driver which is arranged to generate images for the glasses corresponding to the current view of the user.

In many systems, an image representation of a scene may be provided where the image representation includes images and often depth for one or more capture points/view points in the scene. In many such systems, a renderer may be arranged to dynamically generate views that match a current local viewer pose. In such systems, a viewer pose may dynamically be determined, and views dynamically generated to match this viewer pose. Such an operation requires the viewer pose to be aligned with or mapped to the image representation. This is typically done by positioning the viewer at a given optimal or default position in the scene/image representation at the start of the application and then tracking the viewer movement relative to this. The optimal or default position is typically selected to correspond to a position for which the image representation comprises image data, i.e. to a capture or anchor position.

However, as the viewer pose changes from this position, view interpolation and synthesis is required and this will tend to introduce degradation and artefacts, thereby reducing the image quality.

Hence, an improved approach for processing and generating image representations of a scene would be advantageous. In particular, a system and/or approach that allows improved operation, increased flexibility, an improved virtual reality experience, reduced data rates, increased efficiency, facilitated distribution, reduced complexity, facilitated implementation, reduced storage requirements, increased image quality, improved rendering, an improved user experience and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for rendering images, the apparatus comprising: a receiver for receiving an image representation of a scene, the image representation being provided with respect to a scene coordinate system, the scene coordinate system including a reference position; a determiner for determining viewer poses for a viewer, the viewer poses being provided with respect to a viewer coordinate system; an aligner for aligning the scene coordinate system with the viewer coordinate system by aligning the scene reference position with a viewer reference position in the viewer coordinate system; a renderer for rendering view images for different viewer poses in response to the image representation and the alignment of the scene coordinate system with the viewer coordinate system; the apparatus further comprising: an offset processor arranged to determine the viewer reference position in response to a first viewer pose being a viewer pose for which alignment is performed, the viewer reference position being dependent on an orientation of the first viewer pose and having an offset with respect to a viewer eye position for the first viewer pose, the offset including an offset component in a direction opposite to a view direction of the viewer eye position; wherein the receiver is arranged to receive an image data signal comprising the image representation and further comprising an offset indication; and wherein the offset processor is arranged to determine the offset in response to the offset indication.

The invention may provide an improved operation and/or performance in many embodiments. The invention may in particular provide improved image quality for a range of viewer poses.

The approach may in many embodiments provide an improved user experience, e.g. it may in many scenarios allow a flexible, efficient, and/or high performance Virtual Reality (VR) application. In many embodiments, it may allow or enable a VR application with a substantially improved trade-off between image qualities for different viewer poses.

The approach may be particularly suited to e.g. broadcast video services supporting adaptation to movement and head rotation at the receiving end.

The image representation may comprise one or more images of the scene. Each image of an image representation may be associated with and linked to a viewing or capture pose for the scene. The viewing or capture pose may be provided with reference to the scene coordinate system. The scene reference position may be any position in the scene coordinate system. The scene reference position is independent of the viewer pose. The scene reference position may be a predetermined and/or fixed position. The scene reference position may be unchanged between at least some consecutive alignments.

The rendering of the view images may be subsequent to the aligning. The offset component may be in a direction opposite to the view direction of the viewer eye position by being opposite to a view direction for the alignment viewer pose.

The first viewer pose may also be referred to as the alignment viewer pose (it is the viewer pose for which alignment is performed).

The alignment/first viewer pose may be indicative/represent/describe the viewer eye position and the view direction of the viewer eye position. The alignment/first viewer pose comprises data allowing the viewer eye position and the view direction of the viewer eye position to be determined.

The offset indication may be indicative of a target offset to apply between the scene reference position and a viewer eye position when aligning the scene coordinate system to the viewer coordinate system. The target offset may include an offset component in a direction opposite to a view direction of the viewer eye position.

In accordance with an optional feature of the invention, the offset component is no less than 2 cm.

This may provide a particularly advantageous operation in many embodiments. It may in many scenarios allow a sufficiently high quality improvement to be achieved for many viewer poses.

In some embodiments, the offset component is no less than 1 cm, 4 cm, 5 cm, or even 7 cm. Larger offsets have been found to improve the quality of the images generated for view poses corresponding to head rotations while potentially degrading the image quality for forwards views, although typically to a much lower degree.

In accordance with an optional feature of the invention, the offset component is no more than 12 cm.

This may provide a particularly advantageous operation in many embodiments. It may in many scenarios provide improved image quality trade off for images generated for different viewer poses.

In some embodiments, the offset component is no more than 8 cm or 10 cm.

In accordance with an optional feature of the invention, the receiver (301) is arranged to receive an image data signal comprising the image representation and further comprising an offset indication; and wherein the offset processor is arranged to determine the offset in response to the offset indication.

This may provide advantageous operation in many systems and scenarios, such as in particular for broadcasting scenarios. It may allow offset optimization to be performed simultaneously for a plurality of different rendering devices.

In accordance with an optional feature of the invention, the offset processor is arranged to determine the offset in response to an error metric for at least one viewer pose, the error metric being dependent on candidate values of the offset.

This may provide improved operation and/or performance in many embodiments. It may in particular in many embodiments allow an improved trade-off in quality for different viewer poses, and may in many embodiments allow a dynamic optimization. It may further in many embodiments, allow a low complexity and/or efficient/low resource operation.

The offset may in many embodiments be determined as an offset resulting a (combined) minimum error metric for one or more viewer poses.

In some embodiments, the error metric may represent an error measure or value for a continuous range of candidate values. For example, the error metric may be represented as a function of the candidate offset, and the offset may be determined as the candidate offset for which this function is minimized.

In some embodiments, only a discrete number of candidate offset values are considered and the offset processor may determine an error metric/measure/value for each of these candidate values. It may then determine the offset as the candidate offset for which the lowest error metric was found (e.g. after combining error metrics for a plurality of viewer poses).

In accordance with an optional feature of the invention, the offset processor is arranged to determine the error metric for a candidate value in response to a combination of error metrics for a plurality of viewer poses.

This may provide improved operation and/or performance in many embodiments.

In some embodiments, the offset processor is arranged to determine the error metric for one viewer pose of the range of viewer poses in response to an error metric for a range of gaze directions.

In accordance with an optional feature of the invention, the error metric for a viewer pose and a candidate value of the offset comprises an image quality metric for a view image for the viewer pose synthesized from at least one image of the image representation, the at least one image having a position relative to the viewer pose depending on the candidate value.

This may provide improved operation and/or performance in many embodiments.

In accordance with an optional feature of the invention, the error metric for a viewer pose and a candidate value of the offset comprises an image quality metric for a view image for the viewer pose synthesized from at least two images of the image representation, the at least two images having reference positions relative to the viewer pose depending on the candidate value.

This may provide improved operation and/or performance in many embodiments.

In accordance with an optional feature of the invention, the image representation includes an omni-directional image representation.

The invention may in particular provide improved performance for image representations being based on omni-directional images, such as specifically Omni-Directions Stereo (ODS) images.

In accordance with an optional feature of the invention, the offset comprises an offset component in a direction perpendicular to a view direction of the viewer eye position.

This may provide improved operation and/or performance in many embodiments.

The direction perpendicular to a view direction of the viewer eye position may be a horizontal direction. Specifically, it may be in a direction corresponding to a direction from one eye of the viewer pose to the other eye. The vertical component may be in a direction corresponding to a horizontal direction in the scene coordinate system.

In accordance with an optional feature of the invention, the offset comprises a vertical component.

This may provide improved operation and/or performance in many embodiments. The vertical component may be in a direction perpendicular to a plane formed by the view direction of the viewer eye position and a direction between the eyes of the viewer pose. The vertical component may be in a direction corresponding to a vertical direction in the scene coordinate system.

According to an aspect of the invention there is provided an apparatus for generating an image signal, the apparatus comprising: a receiver for receiving a number of images representing a scene from one or more poses; a representation processor for generating image data providing an image representation of the scene, the image data comprising the number of images and the image representation being provided with respect to a scene coordinate system, the scene coordinate system including a scene reference position; an offset generator for generating an offset indication, the offset indication being indicative of an offset to apply between the scene reference position and a viewer eye position when aligning the scene coordinate system to a viewer coordinate system, the offset including an offset component in a direction opposite to a view direction of the viewer eye position; an output processor for generating the image signal to comprise the image data and the offset indication.

According to an aspect of the invention there is provided a method of rendering images, the method comprising: receiving an image representation of a scene, the image representation being provided with respect to a scene coordinate system, the scene coordinate system including a reference position; determining viewer poses for a viewer, the viewer poses being provided with respect to a viewer coordinate system; aligning the scene coordinate system with the viewer coordinate system by aligning the scene reference position with a viewer reference position in the viewer coordinate system; rendering view images for different viewer poses in response to the image representation and the alignment of the scene coordinate system with the viewer coordinate system; the method further comprising: determining the viewer reference position in response to a first viewer pose, the viewer reference position being dependent on an orientation of the first viewer pose and having an offset with respect to a viewer eye position for the first viewer pose, the offset including an offset component in a direction opposite to a view direction of the viewer eye position; wherein receiving the image representation of the scene comprises receiving an image data signal comprising the image representation and further comprising an offset indication; and further comprising determining the offset in response to the offset indication.

According to an aspect of the invention there is provided a method for generating an image signal, the method comprising: receiving a number of images representing a scene from one or more poses; generating image data providing an image representation of the scene, the image data comprising the number of images and the image representation being provided with respect to a scene coordinate system, the scene coordinate system including a scene reference position; generating an offset indication, the offset indication being indicative of an offset to apply between the scene reference position and a viewer eye position when aligning the scene coordinate system to a viewer coordinate system, the offset including an offset component in a direction opposite to a view direction of the viewer eye position; generating the image signal to comprise the image data and the offset indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
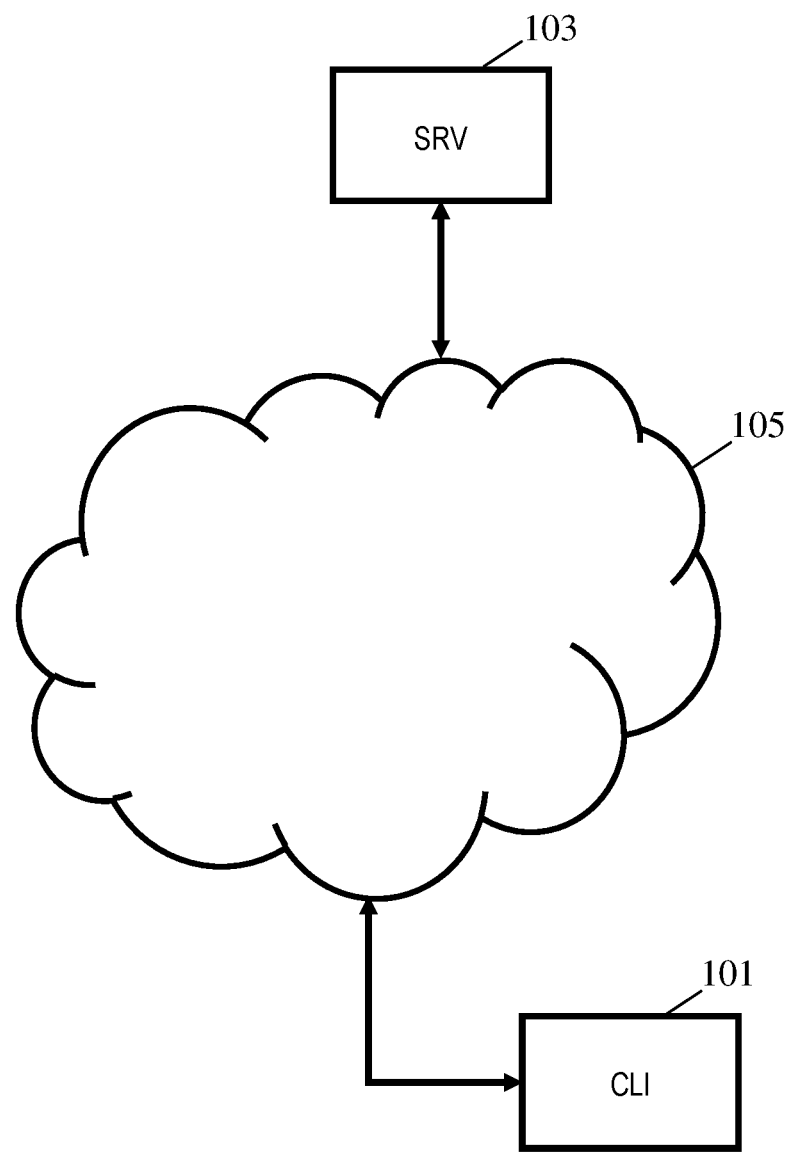
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model.

In many practical systems, the scene may be represented by an image representation comprising image data. The image data may typically comprise images associated with one or more capture or anchor poses, and specifically images may be included for one or more view ports with each view port corresponding to a specific pose. An image representation may be used comprising one or more images where each image represents the view of a given view port for a given view pose. Such view poses or positions for which image data is provided are often referred to as anchor poses or positions or capture poses or positions (since the image data may typically correspond to images that are or would be captured by cameras positioned in the scene with the position and orientation corresponding to the capture pose).

Many typical VR applications may on the basis of such an image representation proceed to provide view images corresponding to viewports for the scene for the current viewer pose with the images being dynamically updated to reflect changes in the viewer pose and with the images being generated based on the image data representing the (possibly) virtual scene/environment/world. The application may do this by performing view synthesis and view shift algorithms as will be known to the skilled person.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position, and these are typically known as having 3 Degrees of Freedom (3DoF).

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene data. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose. The view pose will typically correspond to the head pose, and references to the view pose may typically equivalently be considered to correspond to the references to the head pose.

In many applications, especially for broadcast services, a source may transmit scene data in the form of an image (including video) representation of the scene which is independent of the viewer pose. For example, an image representation for a single view sphere for a single capture position may be transmitted to a plurality of clients. The individual clients may then locally synthesize view images corresponding to the current viewer pose.

An application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this.

The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting image data and depth for a specific viewpoint with the client devices then being arranged to process this information to locally synthesize view images corresponding to the current pose.

Figure 2:
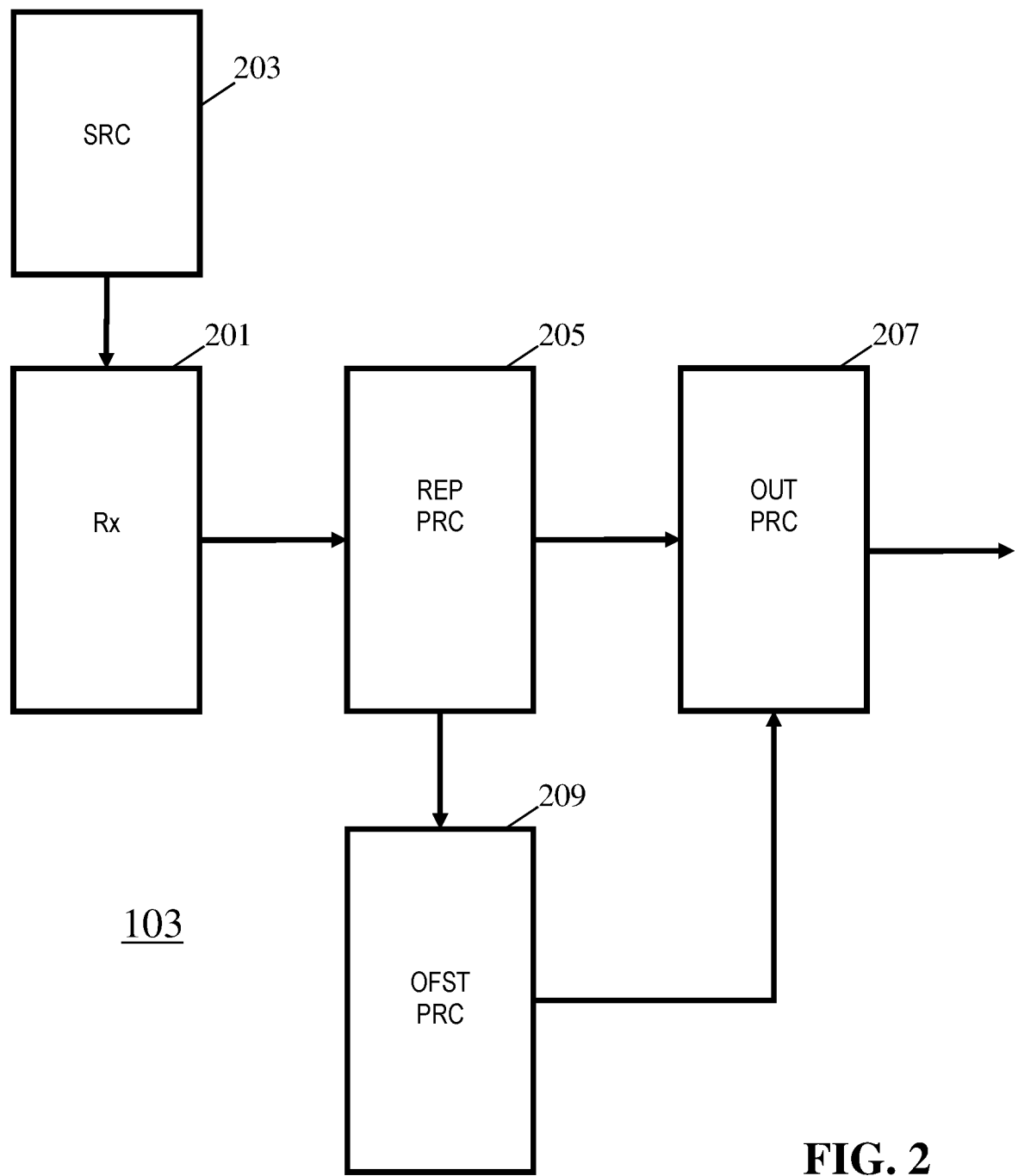
FIG. 2 illustrates an example of elements of an apparatus in accordance with some embodiments of the invention.

FIG. 2 illustrates an example elements of an exemplary implementation of the VR server 103.

The apparatus comprises a receiver 201 which is arranged to receive a number of images representing a scene from one or more poses.

In the example, the receiver 201 coupled to a source 203 which provides the number of images. The source 203 may specifically be a local memory storing the images or it may e.g. be a suitable capture unit such as a set of cameras.

The receiver 201 is coupled to a processor, referred to as a representation processor 205, which is fed the number of images. The representation processor 205 is arranged to generate an image representation of the scene with the image representation including image data derived from the number of images.

The representation processor 205 is coupled to an output processor 207 which generates an image signal comprising the image representation, and thus the image signal specifically comprises the image data of the number of images. In many embodiments, the output processor 207 may be arranged to encode the images and include them in a suitable data stream, such as e.g. a data stream generated in accordance with a suitable standard.

The output processor 207 may further be arranged to transmit or broadcast the image signal to remote clients/devices and specifically the image signal may be communicated to the client device 101.

Figure 3:
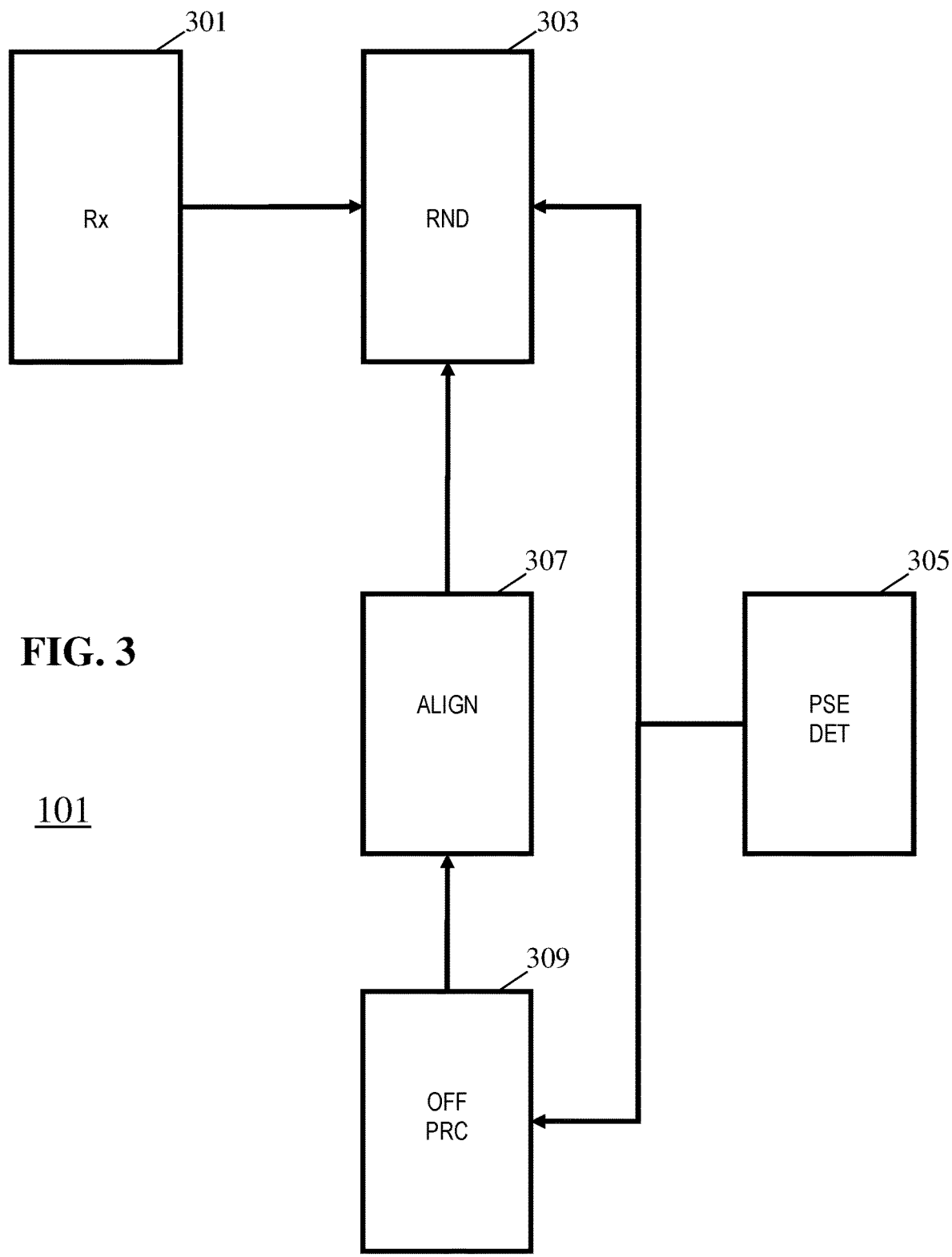
FIG. 3 illustrates an example of elements of an apparatus in accordance with some embodiments of the invention.

FIG. 3 illustrates an example of some elements of an apparatus for rendering images in accordance with some embodiments of the invention. The apparatus will be described in the context of the system of FIG. 1 with the apparatus specifically being the client device 101.

The client device 101 comprises a data receiver 301 which is arranged to receive the image signal from the server 103. It will be appreciated that any suitable approach and format for communication may be used without detracting from the invention.

The data receiver 301 is coupled to a renderer 303 which is arranged to generate view images for different viewports/viewer poses.

The client device 101 further comprises a view pose determiner 305 which is arranged to dynamically determine current viewer poses. Specifically, the view pose determiner 305 may receive data from a headset reflecting the movement of the headset. The view pose determiner 305 may be arranged to determine view poses based on the received data. In some embodiments, the view pose determiner 305 may receive e.g. sensor information (e.g. accelerator, and gyro data) and from this determine a view pose. In other embodiments, the headset may directly provide view pose data).

The view pose is fed to the renderer 303 which proceeds to generate view images corresponding to the views of the scene from the two eyes of the viewer at the current viewer pose. The view images are generated from the received image representation using any suitable image generation and synthesis algorithm. The specific algorithm will depend on the specific image representation and the preferences and requirements of the individual embodiment.

Figure 4:
FIG. 4 illustrates an example of a configuration for an image representation for a scene.

As an example, an image representation may comprise one or more images each of which correspond to viewing the scene from a given viewpoint and with a given direction. Thus, for each of a number of capture or anchor poses, an image is provided corresponding to a view port to the scene from that viewpoint, and in that direction. In many embodiments, a plurality of cameras may for example be positioned in a row and capture a scene from different positions along this line and all being aimed in the same direction, such as in the example of FIG. 4. It will be appreciated that in other embodiments, other capture configurations may be employed including more or fewer anchor points and/or images.

Figure 5:
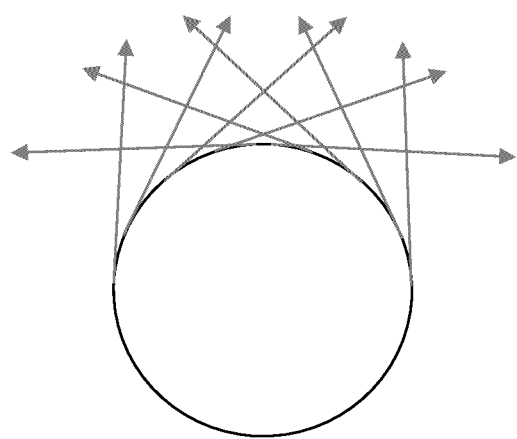
FIG. 5 illustrates an example of an Omni-Directional Stereo image representation of a scene.

In many embodiments, the image representation may be in accordance with a particular existing 3D image format known as Omni Directional Stereo (ODS). For ODS, the rays for the left- and the right-eye image are created such that these rays have their origin on a circle with diameter typically equal to the pupillary distance of e.g. ~6.3 cm. For ODS, narrow angle image sections are captured for opposite directions corresponding to tangents of the view circle and at regular angular distances around the view circle (see FIG. 5).

Thus, for ODS, an image is generated for the left eye where each pixel column corresponds to one position on the unit circle and reflecting the rays in a direction which is a tangent to the ODS view circle at this position. The position on the ODS view circle is different for each column and typically a relatively large number of equidistant positions on the ODS view circle are defined covering the entire 360° field of view with each column corresponding to one position. Thus, a single ODS image captures a full 360° field of view with each column corresponding to a different position on the ODS view circle and to a different ray direction.

Figure 6:
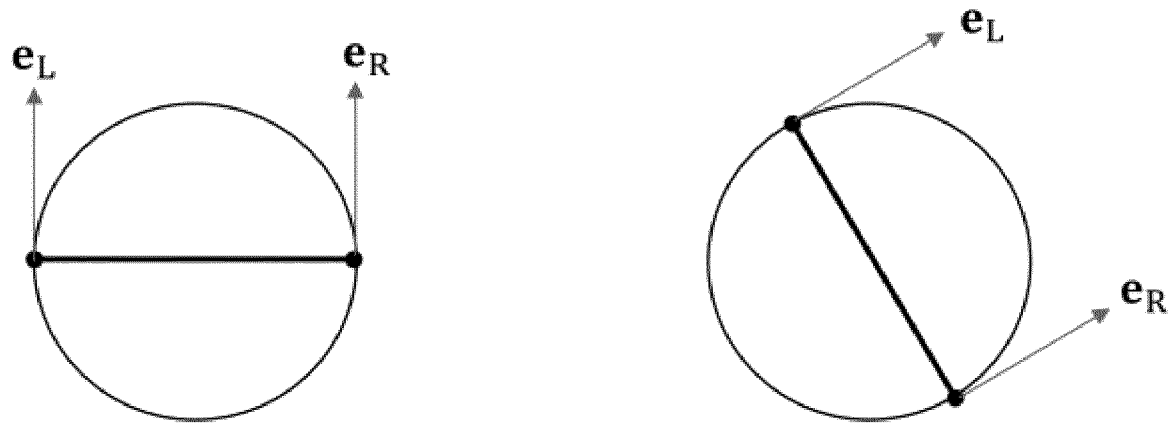
FIG. 6 illustrates examples of an Omni-Directional Stereo image representation of a scene.

ODS includes an image for the right eye and an image for the left eye. As shown in FIG. 6, for a given column in these images, the left eye image and the right eye image will reflect rays of opposite positions on the ODS view circle. Thus, the ODS image format provides both 360° views as well as stereoscopic information based on only two images.

It will be appreciated that whereas the following description considers ODS for which two stereo images are provided (corresponding to the left eye and the right eye images), a corresponding format can be used where only one image is provided, i.e. an omnidirectional mono image format may be used. This image may still be provided with respect to a view circle thereby providing the view from one eye as this e.g. rotates around the center point of the eyes.

Alternatively, by letting the radius of the view circle approach zero, a monoscopic format is achieved. In that case the left and right views are the same, so only one image is required to represent both.

In general, omnidirectional video/images may be provided e.g. as omnidirectional stereo video/images or as omnidirectional mono video/images.

For a given orientation (viewing angle), an image may be generated by combining the narrow angle image sections for directions that match the view directions within the viewport for the given orientation. Thus, a given view image is formed by combining the narrow angle image sections corresponding to the captures in different directions but with the different narrow angle image sections being from different positions on the circle. Thus, a view image is comprised of captures from different positions on the view circle rather than from only a single view point. However, if the view circle of the ODS representation is sufficiently small (relative to the contents of the scene), the impact of this can be reduced to acceptable levels. Further, as captures along a given direction can be reused for a number of different viewing orientations, a substantial reduction in the required amount of image data is achieved. The view images for a viewer's two eyes will typically be generated by captures in opposite directions for the appropriate tangents.

An example of an ideal head rotation that can be supported by ODS is illustrated in FIG. 6. In the example, the head rotates such that both eyes move along a circle with diameter equal to pupillary distance. Assuming that this corresponds to the width of the ODS view circle, the view images for the different orientations can simply be determined by selecting the appropriate narrow angle image sections corresponding to the different view orientations.

However, for standard ODS, an observer will perceive stereopsis but not motion parallax. The absence of motion parallax tends to provide an unpleasant experience even with minor observer motions (in the order of a few centimeters). For example, if the viewer moves such that the eyes no longer fall exactly on the ODS view circle, generating view images based on simply selecting and combining the appropriate narrow angle image sections will result in the generated view images being the same as if the users eyes remained on the view circle, and accordingly the parallax that should result from the user moving his head will not be represented and this will result in the perception not being able to move relative to the real world.

Figure 7:
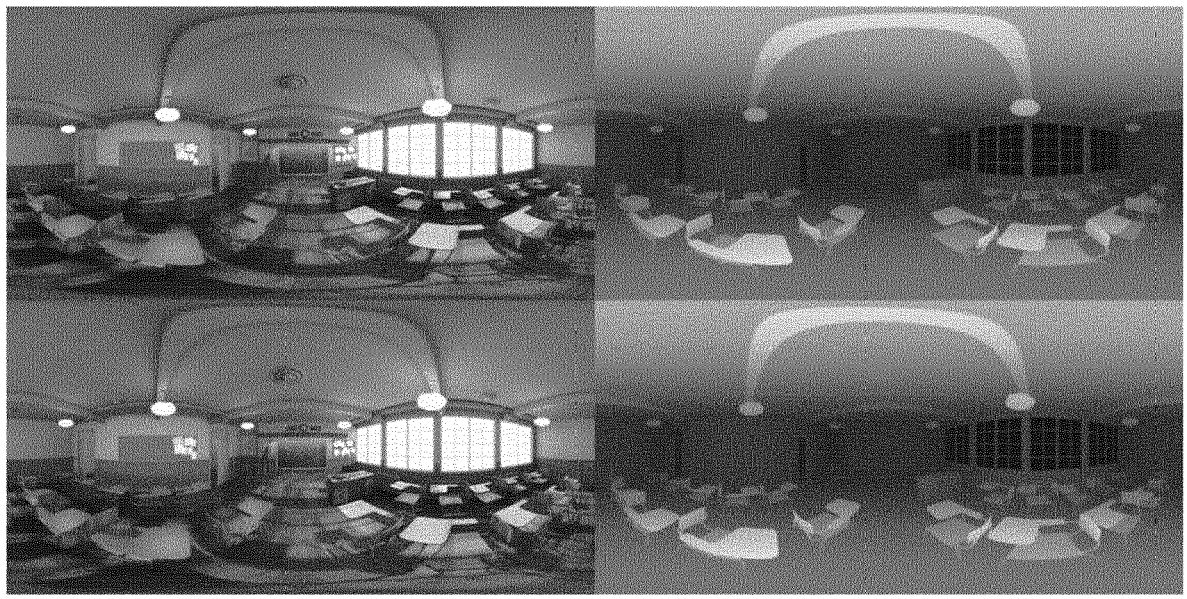
FIG. 7 illustrates an example of an Omni-Directional Stereo image with depth maps.

In order to address this, and to allow for generation of motion parallax based on ODS data, the ODS format may be extended to include depth information. One narrow angle depth map section may be added for each narrow angle image section. An example of ODS images with associated depth maps are illustrated in FIG. 7. This depth information may be used to perform view point shifting such that the generated images correspond to the new position outside (or inside) the view circle (e.g. each view image or narrow angle image section may be processed using a known image and depth based view point shift algorithm). For example, a 3D mesh may be created for each eye and rendering of the ODS data based on the meshes and textures for the left- and the right-eye can be used to introduce motion parallax.

However, whether the image representation is based on e.g. a number of images for different capture poses or on ODS data, generating view images for poses that differ from the anchor poses for which the image data is provided tends to introduce artefacts and errors leading to potential image degradation.

The renderer 303 is arranged to generate view images for the current view pose based on the received image representation. Specifically, right and left eye images may be generated for a stereoscopic display (such as a headset) or a plurality of view images may be generated for views of an autostereoscopic display. It will be appreciated that many different algorithms and techniques are known for generating view images from provided images of a scene, and that any suitable algorithm may be used depending on the specific embodiment.

However, a crucial operation for the rendering is that the determined viewer poses and the image representation must be aligned with each other. The image representation is provided with reference to a given coordinate system for the scene. The image representation includes image data associated with specific anchor poses and these anchor poses are provided with respect to a scene coordinate system.

Similarly, the viewer poses are provided with reference to a viewer coordinate system. For example, the viewer pose data provided by the view pose determiner 305 may indicate changes in the viewer's head position and rotation and this data is provided with respect to a coordinate system.

Thus, inherently, as the image representation and viewer poses are provided independently and are separately generated, they will be provided with respect to two different coordinate systems. In order to render images for the viewer poses based on the image representation, it is accordingly necessary to link/align these coordinate systems with each other. In many situations, the coordinates used may have the same scale and specifically may be provided with respect to coordinate systems that have a scale matching a real world scale. For example, two anchor positions may be defined or described to be 1 meter apart reflecting that they have been captured by cameras one meter apart in the real world, or that they provide views which should be interpreted to be one meter apart. Similarly, the viewer pose data may indicate how the user is moving his head in the real world, such as e.g. how many centimeters the user has moved his head.

However, even in situations where the scales of the coordinate systems are known (or assumed) to be the same, it is necessary to align the relative positions of the coordinate systems with each other. Conventionally, this is typically done upon starting the application by aligning a reference pose (and specifically position) in the scene coordinate system with the current viewer pose. Thus, when starting the application, the viewer is effectively positioned in the scene at a nominal or default starting position. This alignment is then used subsequently such that the viewer position in the scene coordinate system (which may be used by the renderer when rendering the views) is determined by tracking the relative change indicated by the viewer poses in the scene coordinate system. Thus, an indication that the viewer pose has changed two centimeters to the left in the viewer coordinate system will correspond to a two centimeter shift to the left in the scene coordinate system.

The starting alignment of the two coordinate systems is thus conventionally fixed and independent of the actual viewer pose. It is typically an alignment which initializes the viewer at a position in the scene coordinate system that corresponds to a maximum quality, such as at a default position for which the image representation comprises image data. The user starts the experience at a predetermined starting position in the scene and any changes in the viewer pose are then tracked.

However, the inventors have realized that whereas such an approach may be suitable for many applications, it is not ideal for all applications. They have furthermore realized that a more adaptive approach wherein the alignment depends on the viewer pose, and specifically on the viewer orientation may provide improved operation in many embodiments. It may in particular be advantageous for many restricted movement services in which a user is restricted e.g. to small head movements and head rotations. In such services, it may in particular be attractive to perform realignment at certain times (e.g. when the viewer pose indicates a movement since the last alignment meeting a criterion), and the adaptive approach described in the following may be particularly advantageous in such scenarios.

Accordingly, the apparatus of FIG. 3 comprises an aligner 307 which is arranged to align the scene coordinate system with the viewer coordinate system. The alignment may specifically align the coordinate systems by aligning/linking a scene reference position in the scene coordinate system with a viewer reference position in the viewer coordinate system. Thus, the alignment may be such that the scene reference position in the scene coordinate system is collocated with the viewer reference position in the viewer coordinate system, i.e. the scene reference position and the viewer reference position are the same position.

The reference position in the scene coordinate system may be any suitable position and is specifically a fixed, constant scene reference position. In particular, the scene reference position may be one that is independent of the viewer poses, and may often be a predetermined reference position. In embodiments where alignment is performed repeatedly, the scene reference position may be constant between (at least two) consecutive alignment operations.

In many embodiments, the scene reference position may be defined with respect to the anchor positions. For example, the reference position may be an anchor position or e.g. a mean position for the anchor position. In some embodiments, the scene reference position may correspond to a position for which the image representation comprises image data and/or a to a position for which an optimum image quality can be achieved.

In contrast to the scene reference position which is independent of the viewer poses, the viewer reference position is dependent on a first viewer pose which is the viewer pose for which the alignment is performed. This first viewer pose will in the following be referred to as the alignment viewer pose. The alignment viewer pose may be any viewer pose for which the alignment is desired to be performed. In many cases the alignment viewer pose may be the current viewer pose when alignment is performed. The alignment viewer pose may typically be the current viewer pose, and may specifically be the pose indicated by the viewer pose data at the time that the (re)alignment is initialized. Thus, the viewer reference position is dynamically determined when alignment occurs, and the viewer reference position depends on the viewer pose, and specifically it depends on the orientation of the viewer pose.

The apparatus of FIG. 3 accordingly comprises an offset processor 309 which is coupled to the aligner 307 and to the view pose determiner 305. The offset processor 309 is arranged to determine the viewer reference position based on an alignment viewer pose and specifically on the current viewer pose when alignment is performed. The alignment viewer pose is the viewer pose for which alignment between the two coordinate systems is performed, and it will in the following description be considered to be the current viewer pose (when alignment is performed).

The offset processor 309 is specifically arranged to determine the viewer reference position such that it is dependent on the orientation of the alignment/current viewer pose. The offset processor 309 is arranged to generate the viewer reference position such that it is offset with respect to a viewer eye position for the current viewer pose. Further, the offset has a component in a direction which is opposite a view direction of the viewer eye position.

Thus, for a given viewer pose, the viewer reference position is determined such that it is not collocated with any of the eye positions for that viewer pose and neither is it positioned sideways to the eye positions (or on a line between the two eyes). Rather, the viewer reference position is situated "to the back" of the eye positions for the current viewer pose. Thus, in contrast to conventional systems wherein the two coordinate systems are aligned such that e.g. the viewer pose position is always aligned with the reference position, the apparatus of FIG. 3 determines an offset viewer reference position with respect to the viewer pose (and the eye position(s) thereof). The offset is in a direction which is rearwards of the view direction for the current viewer position resulting in an offset between the two coordinate systems. Further, as the offset have a rearwards component, the offset is dependent on the orientation of the viewer pose, and different viewer poses will result in different viewer reference positions, and thus in different alignment offsets.

Specifically, the determined viewer reference positions will be different for two viewer poses representing the same viewer position but different viewer orientations. Equivalently, the same viewer reference position can only be obtained for two viewer poses that represent different orientations if they represent different positions.

Figure 8:
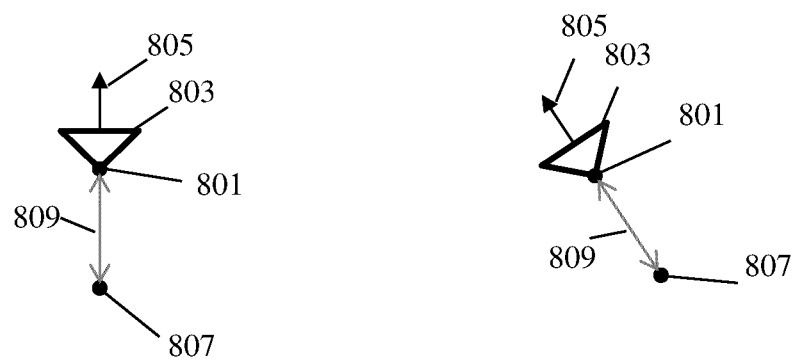
FIG. 8 illustrates an example of determination of a viewer reference position relative to a viewer pose.

As an example, FIG. 8 illustrates a simple example in which the current viewer pose indicates an eye position 801 with a view/viewport 803 in a given direction 805. In this case, a viewer reference position 807 is determined with a rearwards offset 809 to the eye position 801. FIG. 8 illustrates two examples with different orientations. As can be clearly seen, the viewer reference position depends on the rotation (if the eye positions 801 in the two examples are considered to be at the same position, the positions determined as the viewer reference positions 807 will clearly be different).

Figure 9:
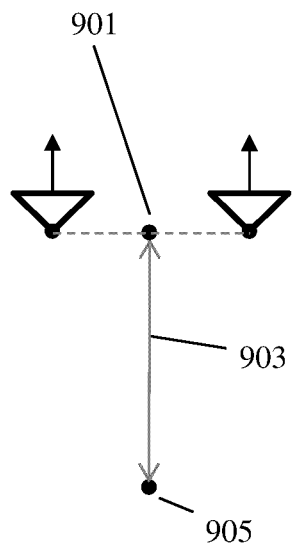
FIG. 9 illustrates an example of determination of a viewer reference position relative to a viewer pose.
Figure 10:
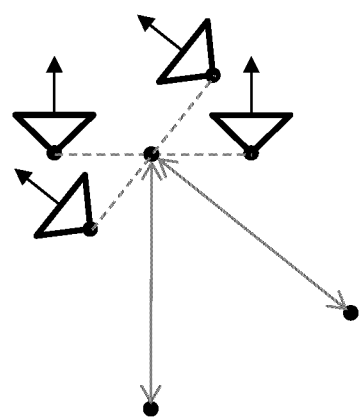
FIG. 10 illustrates an example of determination of a viewer reference position relative to a viewer pose.

FIG. 9 illustrates a corresponding example where the viewer pose 901 is indicative of a midpoint between the eyes of a user. An offset 903 in a rearwards direction provides the viewer reference position 905. FIG. 10 shows two overlaid examples where the viewer pose represents the same position but different orientations. As clearly can be seen the corresponding viewer reference position is different.

Figure 11:
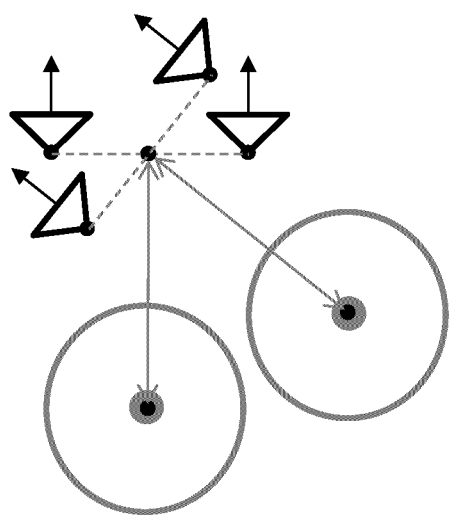
FIG. 11 illustrates an example of determination of a viewer reference position relative to a viewer pose.
Figure 12:
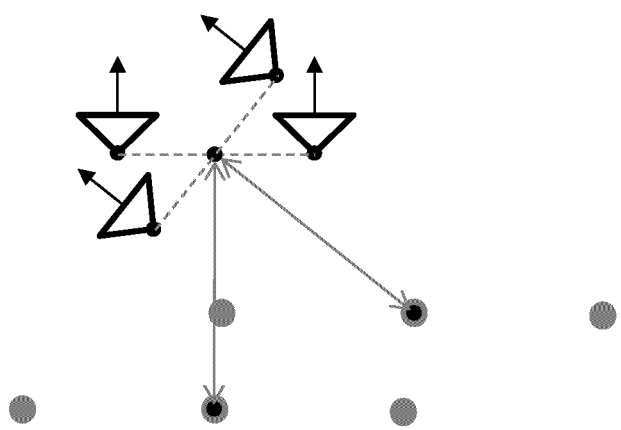
FIG. 12 illustrates an example of determination of an offset for a viewer reference position relative to a viewer pose.

As a consequence, when the viewer reference position is aligned with the scene reference position, the different orientations will result in different alignments between specifically the anchor poses and the viewer pose. This is illustrated in FIG. 11 for an ODS circle image representation and in FIG. 12 for the example of an image representation by images for three capture poses. In the latter example, the orientation of the capture configuration is unchanged but it will be appreciated that in some embodiments this may e.g. be rotated to correspond to the difference in orientation between the viewer poses.

The inventors have realized that such an alignment with an orientation dependent offset may provide substantially improved quality in many practical applications. Specifically, it has been found to provide substantially improved quality in applications where the viewer is restricted to relatively small head movements and rotations. In this case, the adaptive change in the offset may effectively move the image data away from the nominal and default position conventionally used. This may require some additional view shifting to be performed which may reduce the image quality for this specific view pose. However, the inventors have realized that it may typically improve image quality for other proximal poses and specifically for rotational movements. Indeed, by applying a suitable offset, the view shifting required for some other poses may be reduced thereby allowing an improved quality for these poses. The inventors have further realized that the adaptive rearwards offset may typically provide quality improvements for non-alignment viewer poses (i.e. for the poses which do not correspond to the nominal default pose) that substantially outweigh any quality degradation for the alignment viewer pose. The inventors have specifically realized that the adaptive rearwards offset can exploit that the impact on quality of view point shifting in the forwards (and backwards) direction is substantially lower than the impact on quality for sideways viewpoint shifting (e.g. due to de-occlusion effects).

The approach may thus provide improved trade-off by sacrificing some quality degradation for a nominal viewer pose in return for significantly improved quality over a range of other viewer poses. In particular, for an application with restricted head movement, this may often provide a significantly improved user experience, and may also reduce the requirement for re-alignments as a given required image quality can be supported over a larger range of poses.

The exact size of the offset may be different in different embodiments, and may in many embodiments be dynamically determined. However, in many embodiments, the backwards offset component, and thus the offset in the opposite direction of the view direction, is no less than 1 cm, 2 cm, or 4 cm in the viewer coordinate system. The viewer coordinate system is typically a real world scale coordinate system reflecting actual changes in the viewer pose, and specifically position in the real world. The rearwards offset component may thus correspond to at least 1 cm, 2 cm, or 4 cm in a real world scale for the viewer poses.

Such minimum offset values may typically ensure that the offset has a significant impact and that a substantial quality improvement can be achieved for many practical viewer poses and pose variations.

In many embodiments, the backwards offset component, and thus the offset in the opposite direction of the view direction, is no more than 8 cm, 10 cm, or 12 cm in the viewer coordinate system. The rearwards offset component may correspond to no more than 8 cm, 10 cm, or 12 cm in a real world scale for the viewer poses.

Such minimum offset values may typically ensure that the offset is sufficiently low to ensure that the offset does not unreasonably impact the quality for the generated images for the alignment viewer pose.

The selection of offsets with such parameters may specifically result in the viewer reference position typically being positioned within the head of the viewer.

The offset value can be considered to balance between forward viewing quality and sideward viewing quality. Smaller offset values result in a lower error for forward viewing because of a smaller viewpoint shift. Head rotations will however result in a quick degradation of quality due to de-occlusions. The effect of degradations and indeed the offset on sideways viewing typically tends to be far greater than the effect on forward viewing and the benefit of using an offset therefor tends to provide substantially improved benefit for head rotations while only causing minor degradation for forwards viewing.

Thus, smaller offset values (1-4 cm) are useful when it is expected that the viewer will mainly look forward. Larger offset values (8-12 cm) up to offset values that correspond to the rotational axis of the head (projecting up from the neck) result in a quality that does not depend that much on the head rotation. As such, large offset values are suitable when it is expected that the viewer will look around a lot. Intermediate offset values correspond to what we expect to be optimal for typical viewer behavior, where there is a bias for forward looking and thus it is favorable to have more quality for forward viewing, and the approach is applied to reduce the degradation for sideward viewing.

In many embodiments, the backwards offset component, and thus the offset in the opposite direction of the view direction, is no less than $1/10$, $1/5$, $1/3$ or $1/2$ of a (nominal/default/ assumed) inter-eye distance. In many embodiments, the backwards offset component, and thus the offset in the opposite direction of the view direction, is no more than 1, 1.5, or 2 times a (nominal/default/assumed) inter-eye distance.

In some embodiments, the normalized scale for the offset may be considered to be in the range of [0, 1] with 0 at the cameras (e.g. no change in position resulting from rotations) and 1 at the neck/head rotation position. A normalized distance of 1 may often be considered to correspond to e.g. 8, 10, or 12 cm.

Different approaches for determining the offset may be used in different embodiments. For example, in some embodiments, a predetermined and fixed offset may simply be applied in all situations. Thus, the offset may be an inherent part of the alignment process and may be hard coded into the algorithm. However, in many embodiments, the offset may be dynamically determined during operation.

In some embodiments, the offset may be generated at the server side and may be provided to the rendering device together with the image representation, and specifically as part of the image signal.

Specifically, the VR server 103 of FIG. 2 may comprise an offset generator 209 which is arranged to determine an offset between the viewer reference position and the viewer eye position for the viewer pose for which the alignment is to be performed. The offset generator 209 may thus determine an offset to apply between the scene reference position and the viewer eye position when aligning the scene coordinate system to the viewer coordinate system. As previously described, the offset includes an offset component in a direction opposite to a view direction of the viewer eye position, i.e. opposite to the direction of view for the alignment viewer pose. An offset indication may then be generated to at least partially represent the offset, and this offset indication may be included in the image signal which is transmitted to the client device 101. The client device 101 may then proceed to determine the offset to be applied from the offset indication, and it may then use this offset when aligning the scene coordinate system and the viewer coordinate system, specifically it may apply the offset to the viewer eye position to determine the viewer reference position. Such an approach may be particularly advantageous in many embodiments, such as e.g. for broadcast applications. The approach may specifically allow an optimization process to be performed to determine the best offset in accordance with a suitable criterion and this optimized offset may then be communicated to all client devices which can use it when performing the alignment.

Thus, in such embodiments, the client device 101 may receive an image data signal which in addition to the image representation also includes an offset indication. The client device 101 may then use this offset directly (or e.g. after modification).

The offset may accordingly be dynamically determined based on e.g. an optimization process. Such a process may be performed at the source or may e.g. be performed by the rendering device, i.e. by the client device 101 in the previous examples.

The offset generator 209 may use any suitable approach for generating an appropriate offset. For example, in some embodiments, a user input may be used to select a preferred offset, e.g. by enabling a user to dynamically adjust the offset and then generating images for different viewer poses. In other embodiments, an automated process may be used for evaluating a range of candidate values for the offset, and the value resulting in the highest quality over a suitable range of viewer poses may be used.

The server may specifically emulate the operation performed at the rendering side to evaluate the impact of different offsets. For example, it may evaluate different candidate values by emulating the processing that would be performed by a renderer and then evaluate the resulting quality using a suitable quality measure. Indeed, the approaches, algorithms, and considerations described with respect to the renderer/receiver/client, and specifically with respect to the offset processor 309, may also performed by the offset generator 209 when determining an offset to be indicated in the image data stream.

It will also be appreciated that any suitable way of providing an indication of an offset may be used. In many embodiments, a fully described offset to be applied may be described, e.g. by providing a two or three dimensional vector indication. Such a offset vector may for example indicate the direction and size of the offset to be applied. When determining the viewer reference position, a renderer may then position the vector at the alignment eye position and with a direction determined relative to the eye view direction for the alignment viewer pose.

In some embodiments, the offset indication may only comprise a partial representation of the offset. For example, in many embodiments, the offset indication may only include a distance/size indication and/or a direction indication. In such cases, the renderer may for example determine suitable values for these. Thus, in some embodiments, the determination of the offset may be based on decisions made both at the server and client side. For example, the direction may be given by the offset indication and determined by the server whereas the size/distance is determined by the renderer. In the following, an approach for determining the offset by the offset processor 309 will be described. It will be appreciated that the described principles and approach can equally be performed by the offset generator 209 with the resulting offset being included in the image data stream. Thus, in the following, references to the offset processor 309 may be considered to equally (mutatis muntandis) apply to the offset generator 209.

The approach is based on the offset processor 309 determining an error metric (value/measure) for one or more viewer poses for different candidate values for the offset. It may then select the candidate value that results in the lowest error metric and use this value for the offset when performing the alignment.

In many embodiments, the error metric for a given candidate offset may be determined in response to combination of error metrics for a plurality of viewer poses, such as specifically for a range of viewer poses. For example, for different viewer poses an error metric indicative of an image quality degradation when generating view images for that view pose from the image representation when the offset is set to the candidate offset may be determined. The resulting error metrics for the different viewer poses may then be averaged to provide a combined error metric for the candidate value. The combined error metrics for the different candidate values can then be compared.

In many embodiments, the error metric for a candidate value may be generated by combining error metrics from a plurality of different positions and/or for a plurality of different poses.

In some embodiments, the error metric for one viewer pose for one candidate value may be in response to error metrics for a plurality, and typically for a range, of gaze directions. Thus, not only may different positions and/or orientations be considered but for a given pose the quality in different gaze directions, i.e. in different directions of the viewport for the given view pose, may be considered.

As an example, the offset processor 309 may determine an error metric for a rearward offsets of 2 cm, 4 cm, 6 cm, 8 cm, 10 cm, and 12 cm. The error metric may for example be determined for each of the corresponding candidate offsets as an indication of an image quality for a rendered image for a set of viewer poses, such as for example a viewer pose corresponding to the current user turning his head left or right by an amount of, say, 15°, 30°, and 45°. The candidate offset resulting in the lowest error metric may then be selected.

The exact error metric which is considered may be different in different embodiments. Typically, a suitable error metric is indicative of a quality degradation for view synthesis from the image representation for that pose and candidate offset. Thus, the error metric for a viewer pose and candidate value comprises an image quality metric for a view image for the viewer pose synthesized from (at least one image of) the image representation.

In an embodiment where the offset is determined on the server side based on image generation from a model of the scene, the image for a given candidate offset and viewer pose may be generated and compared to a corresponding image generated directly from the model.

In other embodiments, more indirect measures may be used. For example, the distance from a viewer pose for which image data is synthesized to a capture pose for which image data is provided (with the given candidate offset) may be determined. The larger the distance, the larger the error metric may be considered to be.

In some embodiments, the determination of the error metric may include consideration of more than one capture pose. Thus, it may specifically be considered that a synthesized image for a given viewer pose can be generated based on different anchor pose images in case the image representation includes more than one. For example, for an image representation such as that of FIG. 12, synthesis may be based on either of the anchor images, and indeed a given pixel of the synthesized image may be generated by considering two or more of the anchor images. For example, interpolation may be used.

Thus, in some embodiments, the error metric for a viewer pose and candidate value comprises an image quality metric for a view image for the viewer pose which is synthesized from at least two images of the image representation where the at least two images have reference positions relative to the viewer pose depending on the candidate offset value.

A specific example of an approach for selecting an offset will be described with reference to FIGS. 13-15. In the example, the image representation is a single ODS stereo image.

Figure 13:
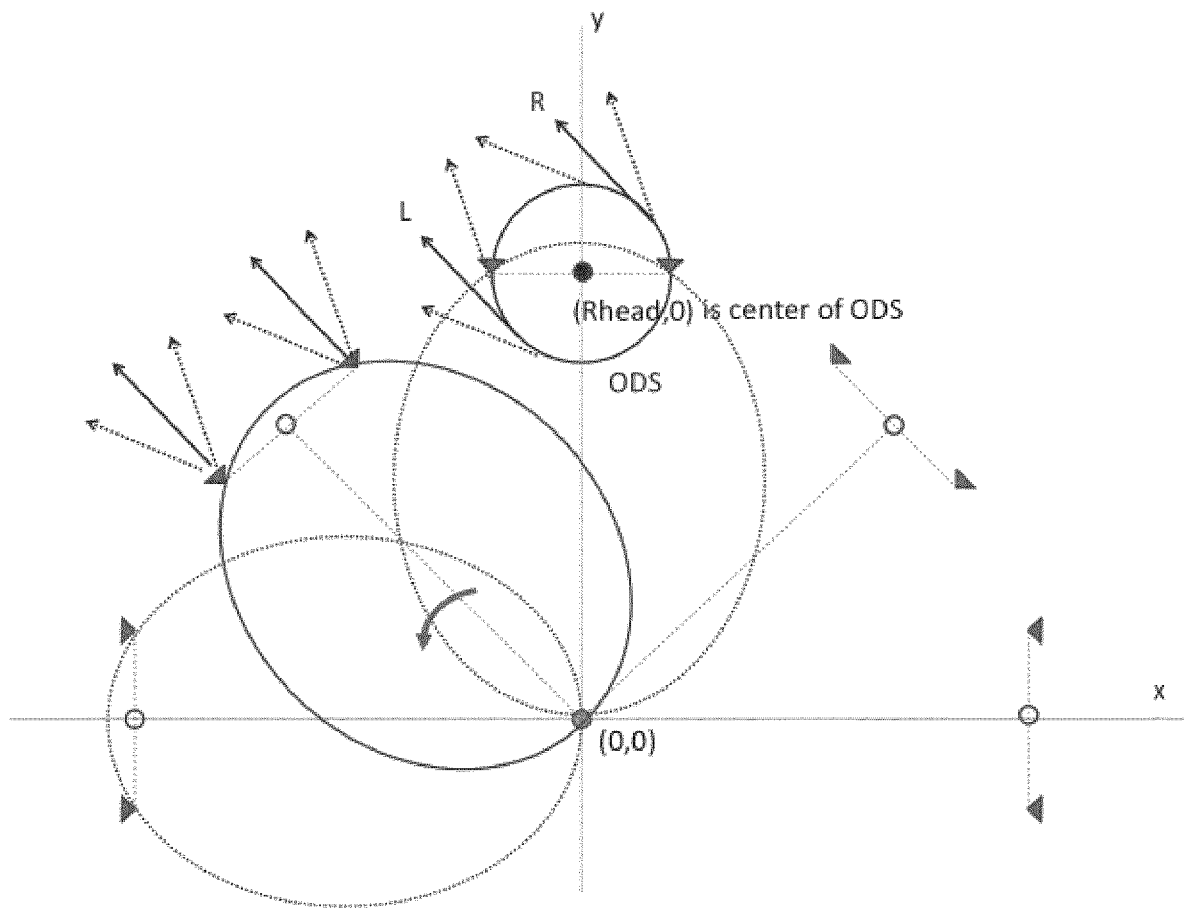
FIG. 13 illustrates an example of determination of an offset for a viewer reference position relative to a viewer pose.

FIG. 13 illustrates a viewer's head as an ellipse with two eye positions/viewpoints towards the front. A nominal head pose corresponding to a current/alignment viewer pose is illustrated as coinciding with the y axis. The figure further shows some potential head rotations of respectively 45° and 90° to the left (corresponding rotations to the right are illustrated only by eye positions).

FIG. 13 further illustrates how conventionally, the alignment will be such that the ODS view circle is positioned to coincide with the eyes of the viewer.

Figure 14:
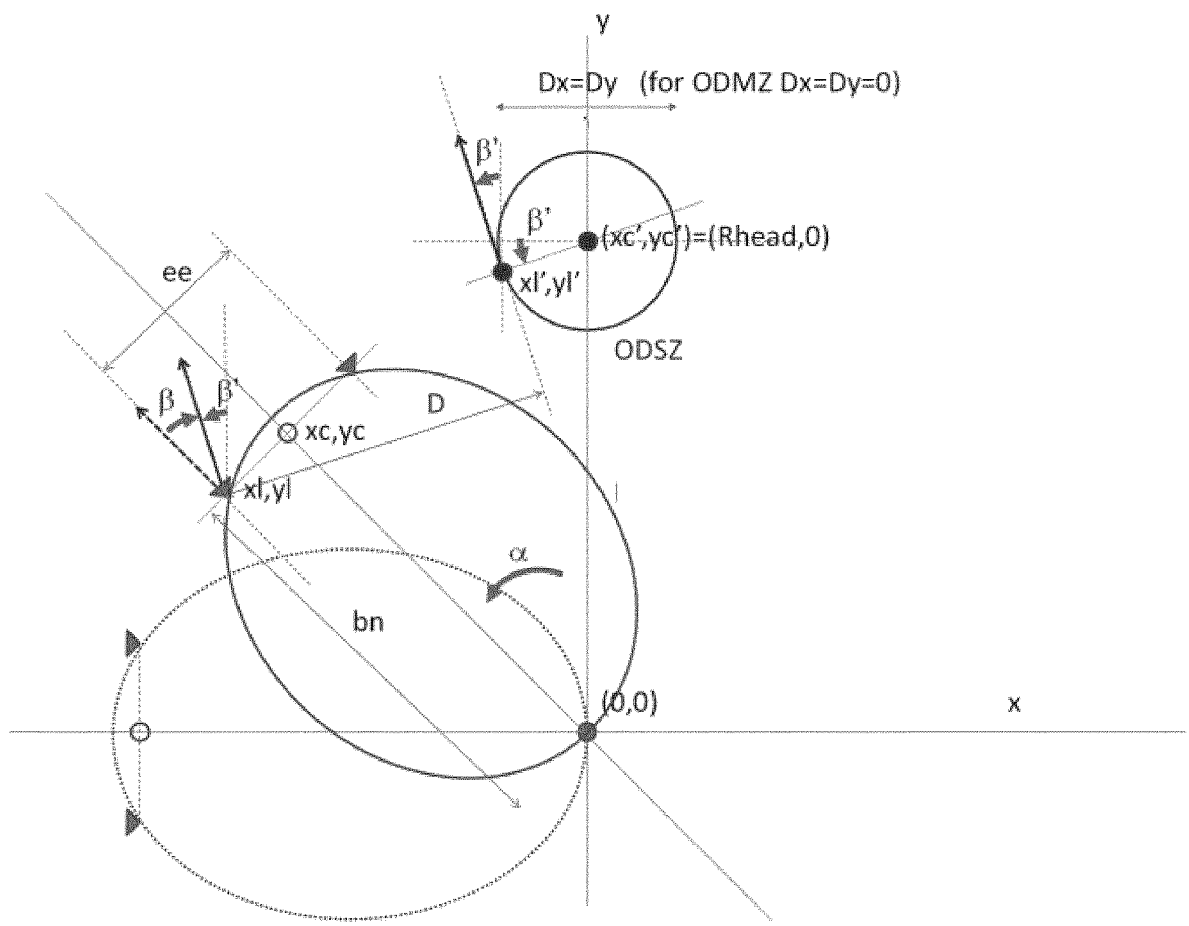
FIG. 14 illustrates an example of determination of an offset for a viewer reference position relative to a viewer pose.

FIG. 14 illustrates an example of how an error metric can be generated for a view pose corresponding to a head rotation a. In the example, the resulting position xl, yl for the left eye can be determined and for this position, a gaze direction β is determined. The distance D from the eye position xj, xy to a tangent for the ODS view circle at the position xl',yl' which comprises image data for a ray in the gaze direction is determined. This distance D is indicative of an image degradation that occurs for a pixel in the gaze direction β for a head rotation α when this is generated from the ODS view images when the ODS view circle is positioned as shown. Thus, a combined error metric may be generated by averaging corresponding error metrics over a range of gaze directions (e.g. −45°<β<+45° and over a range of head rotation angles (e.g. −90°<β<+90° (in some embodiments different positions of the head may also be considered). The resulting combined error metric may thus be indicative of an averaged magnitude of the "viewpoint shift distance" that is required when generating view images for head rotations from an ODS stereo image positioned as shown.

In many embodiments, the approach may be performed for both the left and right eye and the metrics for these may be combined.

Figure 15:
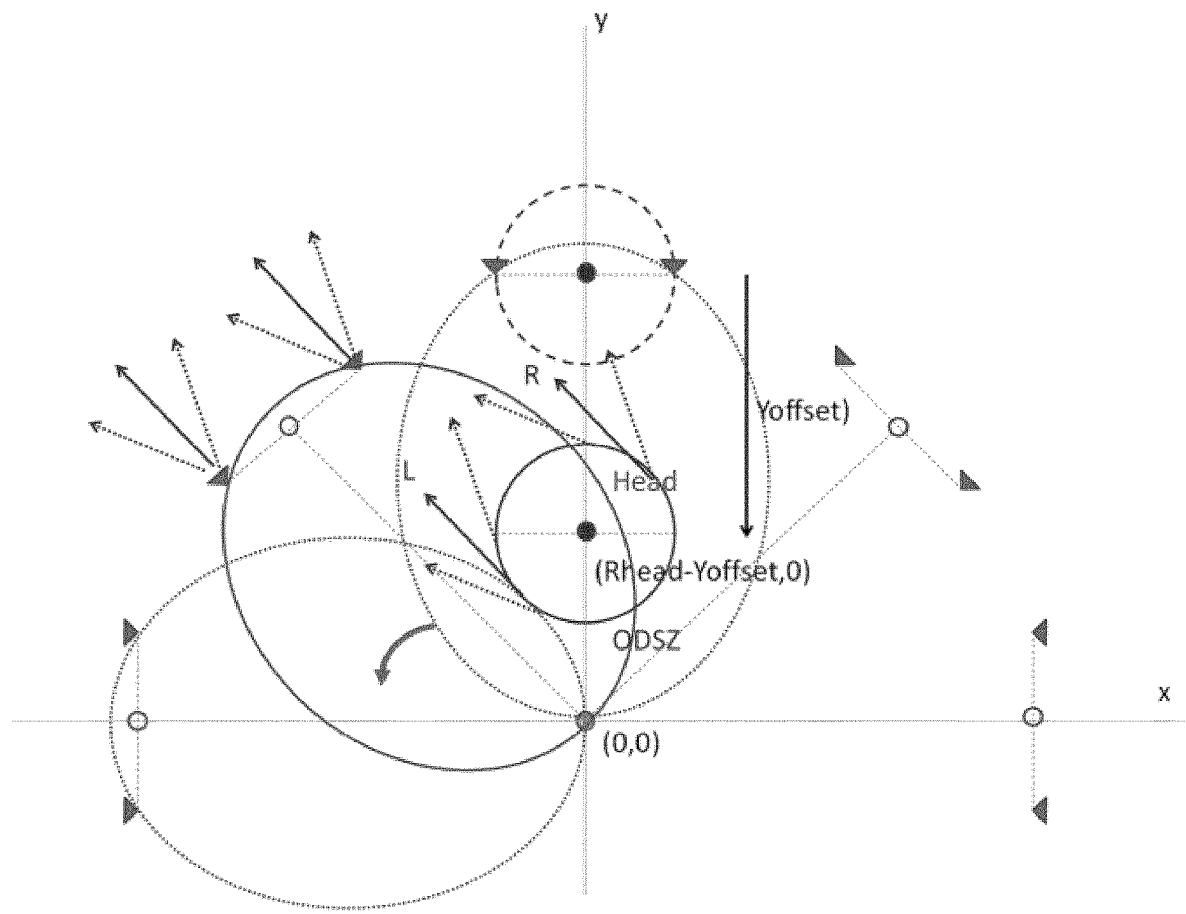
FIG. 15 illustrates an example of determination of an offset for a viewer reference position relative to a viewer pose.

As indicated by FIG. 15, this may be done for different positions of the ODS view circle, and specifically for different offsets in the y direction, and the offset/position for which the smallest error metric is found may be selected as the offset to use for the alignment.

In some embodiments, the offset is directly in the backwards direction and thus is directly in the opposite direction of the view direction for the current/alignment viewer pose. With respect to the viewer coordinate system (and thus a viewer), the backwards direction is a direction of (or parallel to) an intersection of a sagittal or median plane and a transverse or axial plane for the viewer (see e.g. https://en.wikipedia.org/wiki/Anatomical_plane). The direction is also (e.g. in ultrasound) known as an axial (forward, into the body) direction.

However, in some embodiments and scenarios, the offset may also include a lateral component, i.e. the offset may comprise an offset component in a direction which is perpendicular to the view direction for the alignment viewer pose. This lateral component may still be in a horizontal direction, and specifically may be in a direction corresponding to the direction between the two eyes of a viewer.

The lateral component may with respect to the viewer coordinate system (and thus a viewer), be in a direction of (or parallel to) an intersection of a coronal or frontal plane and a transverse or axial plane for the viewer . The direction is also (e.g. in ultrasound) known as a lateral direction.

A lateral offset component may provide for a more flexible approach that may in many embodiments provide improved quality over a range of viewer poses. For example, if it is known or assumed that the current viewer pose for which alignment is performed is not symmetric with respect to expected or assumed further movements of the viewer, an improved average quality for future viewer poses may be achieved by laterally offsetting the viewer reference position towards the positions that are more likely for the viewer's future positions.

In some embodiments, the offset may comprise a vertical component.

The vertical component may with respect to the viewer coordinate system (and thus a viewer), be in a direction of (or parallel to) an intersection of a coronal or frontal plane and a sagittal or median plane for the viewer. The direction is also (e.g. in ultrasound) known as a transverse direction.

For example, typical scenes have more situations below eye level, then above. When the viewer is more likely to look down then up, then it is favorable to have a small upward offset to reduce the amount of de-occlusion when the viewer looks down.

As another example, it may be considered that the viewer may move his head by nodding up and down. This will cause a movement in the eye positions and orientations and thus will affect the view point shift. The approaches described previously may be enhanced to further consider determining a vertical offset. For example, when determining an error metric for a given candidate offset value, this may include evaluating viewer poses that correspond to different up down head rotations. Similarly, candidate offset values that have a vertical component may be evaluated.

Such an approach may provide improved flexibility for user movements and may provide an improved overall quality for an increased range of movements.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

In accordance with some embodiments, there may be provided:

An apparatus for rendering images, the apparatus comprising:

a receiver (301) for receiving an image representation of a scene, the image representation being provided with respect to a scene coordinate system, the scene coordinate system including a reference position;

a determiner (305) for determining viewer poses for a viewer, the viewer poses being provided with respect to a viewer coordinate system;

an aligner (307) for aligning the scene coordinate system with the viewer coordinate system by aligning the scene reference position with a viewer reference position in the viewer coordinate system;

a renderer (303) for rendering view images for different viewer poses in response to the image representation and the alignment of the scene coordinate system with the viewer coordinate system;

the apparatus further comprising an offset processor (309) arranged to determine the viewer reference position in response to an alignment viewer pose, the viewer reference position being dependent on an orientation of the alignment viewer pose and having an offset with respect to a viewer eye position for the alignment viewer pose, the offset including an offset component in a direction opposite to a view direction of the viewer eye position.

An apparatus for generating an image signal, the apparatus comprising:

a receiver (201) for receiving a number of images representing a scene from one or more poses;

a representation processor (205) for generating image data providing an image representation of the scene, the image data comprising the number of images and the image representation being provided with respect to a scene coordinate system, the scene coordinate system including a scene reference position;

an offset generator (209) for generating an offset indication, the offset indication being indicative of an offset between the scene reference position and a viewer reference position in a viewer coordinate system, an output processor (207) for generating the image signal to comprise the image data and the offset indication.

A method of rendering images, the method comprising:
receiving an image representation of a scene, the image representation being provided with respect to a scene coordinate system, the scene coordinate system including a reference position;
determining viewer poses for a viewer, the viewer poses being provided with respect to a viewer coordinate system;
aligning the scene coordinate system with the viewer coordinate system by aligning the scene reference position with a viewer reference position in the viewer coordinate system;
rendering view images for different viewer poses in response to the image representation and the alignment of the scene coordinate system with the viewer coordinate system;
the method further comprising
determining the viewer reference position in response to an alignment viewer pose, the viewer reference position being dependent on an orientation of the alignment viewer pose and having an offset with respect to a viewer eye position for the alignment viewer pose, the offset including an offset component in a direction opposite to a view direction of the viewer eye position.

A method for generating an image signal, the method comprising:
receiving a number of images representing a scene from one or more poses;
generating image data providing an image representation of the scene, the image data comprising the number of images and the image representation being provided with respect to a scene coordinate system, the scene coordinate system including a scene reference position;
generating an offset indication, the offset indication being indicative of an offset between the scene reference position and a viewer reference position in a viewer coordinate system,
generating the image signal to comprise the image data and the offset indication.

The above apparatuses and methods may be combined with each of the features of the subclaims, either individually or in any combination.

The invention claimed is:
1. An apparatus comprising:
a receiver circuit,
wherein the receiver circuit is arranged to receive an image representation of a scene,
wherein the image representation is provided with respect to a scene coordinate system,
wherein the scene coordinate system comprises a reference position;
a determiner circuit,
wherein the determiner circuit is arranged to determine viewer poses for a viewer,
wherein the viewer poses is provided with respect to a viewer coordinate system;
an aligner circuit, wherein the aligner circuit is arranged to align the scene coordinate system with the viewer coordinate system by aligning the scene reference position with a viewer reference position in the viewer coordinate system;
a renderer circuit, wherein the renderer circuit is arranged to render view images for different viewer poses in response to the image representation and the alignment of the scene coordinate system with the viewer coordinate system;
an offset processor circuit,
wherein the processor circuit is arranged to determine the viewer reference position in response to a first viewer pose,
wherein the first viewer post is a viewer pose for which alignment is performed,
wherein the viewer reference position is dependent on an orientation of the first viewer pose,
wherein the viewer reference position has an offset with respect to a viewer eye position for the first viewer pose,
wherein the offset comprises an offset component in a direction opposite to a view direction of the viewer eye position,
wherein the offset processor circuit is arranged to determine the offset in response to an offset indication,
wherein the receiver circuit is arranged to receive an image data signal,
wherein the image data signal comprises the image representation and the offset indication.

2. The apparatus of claim 1, wherein the offset component is no less than 2 cm.

3. The apparatus of claim 1, wherein the offset component is no more than 12 cm.

4. The apparatus of claim 1,
wherein the offset processor circuit is arranged to determine the offset in response to an error metric for at least one viewer pose,
wherein the error metric is dependent on candidate values of the offset.

5. The apparatus of claim 4, wherein the offset processor circuit is arranged to determine the error metric for a candidate value in response to a combination of error metrics for a plurality of viewer poses.

6. The apparatus of any of claim 4,
wherein the error metric for a viewer pose and a candidate value of the offset comprises an image quality metric for a view image for the viewer pose,
wherein the view image is synthesized from at least one image of the image representation,
wherein the at least one image has a position relative to the viewer pose depending on the candidate value.

7. The apparatus of claim 4,
wherein the error metric for a viewer pose and a candidate value of the offset comprises an image quality metric for a view image for the viewer pose,
wherein the view image is synthesized from at least two images of the image representation,
wherein the at least two images has reference positions relative to the viewer pose depending on the candidate value.

8. The apparatus of claim 1, wherein the image representation includes an omni-directional image representation.

9. The apparatus of claim 1, wherein the offset comprises an offset component in a direction perpendicular to a view direction of the viewer eye position.

10. The apparatus of claim 1, wherein the offset comprises a vertical component.

11. An apparatus comprising:
an output processor circuit,
wherein the output processor circuit is arranged to generate the image signal,
wherein the image signal comprises an image data and an offset indication
a receiver circuit,
wherein the receiver circuit is arranged to receive a plurality of images, wherein the plurality of images represent a scene from at least one pose(s);
a representation processor circuit,
  wherein the representation processor circuit is arranged to generate the image data,
  wherein the image data comprises an image representation of the scene,
  wherein the image data comprises the plurality of images,
  wherein the image representation is provided with respect to a scene coordinate system,
  wherein the scene coordinate system comprises a scene reference position;
an offset generator circuit,
  wherein the offset generator circuit is arranged to generate the an offset indication,
  wherein the offset indication is indicative of an offset,
  wherein the offset is applied between the scene reference position and a viewer eye position when aligning the scene coordinate system to a viewer coordinate system,
  wherein the offset comprises an offset component in a direction opposite to a view direction of the viewer eye position.

12. The apparatus of claim 11,
wherein the offset generator circuit is arranged to determine the offset in response to an error metric for at least one viewer pose,
wherein the error metric is dependent on candidate values of the offset.

13. The apparatus of claim 12, wherein the offset generator circuit is arranged to determine the error metric for a candidate value in response to a combination of error metrics for a plurality of viewer poses.

14. A method of rendering images, the method comprising:
receiving an image representation of a scene,
  wherein the image representation is provided with respect to a scene coordinate system,
  wherein the scene coordinate system comprises a reference position;
determining viewer poses for a viewer, wherein the viewer poses is provided with respect to a viewer coordinate system;
aligning the scene coordinate system with the viewer coordinate system by aligning the scene reference position with a viewer reference position in the viewer coordinate system;
rendering view images for different viewer poses in response to the image representation and the alignment of the scene coordinate system with the viewer coordinate system; and
determining the viewer reference position in response to a first viewer pose,
  wherein the viewer reference position is dependent on an orientation of the first viewer pose,
  wherein the viewer reference position has an offset with respect to a viewer eye position for the first viewer pose,
  wherein the offset comprises an offset component in a direction opposite to a view direction of the viewer eye position,
wherein receiving the image representation of the scene comprises receiving an image data signal,
wherein the image data signal comprises the image representation and an offset indication; and
determining the offset in response to the offset indication.

15. A computer program stored on a non-transitory medium, wherein the computer program when executed on a processor performs the method as claimed in claim 14.

16. The method of claim 14, further comprising, determining the offset in response to an error metric for at least one viewer pose, wherein the error metric is dependent on candidate values of the offset.

17. The method of claim 16, further comprising determining the error metric for a candidate value in response to a combination of error metrics for a plurality of viewer poses.

18. The method of claim 17, further comprising determining the error metric for a candidate value in response to a combination of error metrics for a plurality of viewer poses.

19. A method for generating an image signal, the method comprising:
receiving a plurality of images, wherein the plurality of images represent a scene from at least one pose(s);
generating image data,
  wherein the image data comprises an image representation of the scene,
  wherein the image data comprises the plurality of images,
  wherein the image representation is provided with respect to a scene coordinate system,
  wherein the scene coordinate system comprises a scene reference position;
generating an offset indication,
  wherein the offset indication is indicative of an offset,
  wherein the offset is applied between the scene reference position and a viewer eye position when aligning the scene coordinate system to a viewer coordinate system,
  wherein the offset comprises an offset component in a direction opposite to a view direction of the viewer eye position; and
generating the image signal, wherein the image signal comprises the image data and the offset indication.

20. A computer program stored on a non-transitory medium, wherein the computer program when executed on a processor performs the method as claimed in claim 19.

21. The method of claim 19, further comprising, determining the offset in response to an error metric for at least one viewer pose, wherein the error metric is dependent on candidate values of the offset.

* * * * *